US008320741B1

(12) United States Patent
Herz (10) Patent No.: US 8,320,741 B1
(45) Date of Patent: Nov. 27, 2012

(54) MEDIA CAPTURE SYSTEM, METHOD, AND COMPUTER PROGRAM PRODUCT FOR ASSESSING PROCESSING CAPABILITIES

(75) Inventor: William S. Herz, Hayward, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1379 days.

(21) Appl. No.: 11/958,289

(22) Filed: Dec. 17, 2007

(51) Int. Cl.
*H04N 9/80* (2006.01)

(52) U.S. Cl. .................. 386/248; 386/239; 386/E5.001; 702/182; 702/186; 702/187; 345/501

(58) Field of Classification Search .................. 702/186, 702/182, 189; 345/501; 386/248, 239, E5.001
See application file for complete search history.

(56) References Cited

U.S. PATENT DOCUMENTS

| | | | |
|---|---|---|---|
| 5,446,492 A * | 8/1995 | Wolf et al. ..................... 348/192 |
| 5,808,908 A * | 9/1998 | Ghahramani ................. 702/182 |
| 6,833,833 B1 * | 12/2004 | Lippincott ..................... 345/534 |
| 7,027,972 B1 * | 4/2006 | Lee ................................ 703/22 |
| 7,519,507 B1 * | 4/2009 | Herz .............................. 702/182 |
| 7,561,161 B2 * | 7/2009 | Minadakis ..................... 345/501 |
| 7,647,203 B1 * | 1/2010 | Herz ............................. 702/182 |
| 2004/0123297 A1 * | 6/2004 | Flautner et al. .............. 718/102 |
| 2004/0199359 A1 * | 10/2004 | Laird ........................... 702/182 |
| 2005/0262258 A1 * | 11/2005 | Kohno et al. ................. 709/231 |
| 2006/0090010 A1 * | 4/2006 | Qin ............................... 709/246 |
| 2006/0174233 A1 * | 8/2006 | Minadakis ..................... 717/140 |
| 2006/0188174 A1 * | 8/2006 | Minadakis ..................... 382/284 |
| 2009/0147143 A1 * | 6/2009 | Sherif et al. .................. 348/701 |
| 2010/0246668 A1 * | 9/2010 | Rintaluoma ............. 375/240.02 |
| 2010/0302453 A1 * | 12/2010 | Paschalakis et al. .......... 348/702 |
| 2011/0009987 A1 * | 1/2011 | Seefeldt et al. ................. 700/94 |
| 2011/0075729 A1 * | 3/2011 | Dane et al. ............... 375/240.03 |

* cited by examiner

Primary Examiner — Kambiz Zand
Assistant Examiner — Tongoc Tran
(74) Attorney, Agent, or Firm — Zilka-Kotab, PC (57) ABSTRACT

A media capture system, method, and computer program product are provided for assessing processing capabilities. In use, media data is captured from a system. Additionally, the media data is stored in memory separate from the system. Further, the media data is fed back to the system for assessing media processing capabilities of the system in real-time or non-real-time.

23 Claims, 7 Drawing Sheets

MEDIA CAPTURE SYSTEM, METHOD, AND COMPUTER PROGRAM PRODUCT FOR ASSESSING PROCESSING CAPABILITIES

FIELD OF THE INVENTION

The present invention relates to benchmarking, and more particularly to benchmarking various processing capabilities.

BACKGROUND

Benchmarking typically refers to a test used to compare various aspects of computer-related hardware and/or software. Trade magazines and other organizations have developed various benchmark tests, which may be used when reviewing a class of products. One particular type of benchmarking is three-dimensional graphics benchmarking which tests different aspects of a graphics processor and, in particular, the manner in which the graphics processor processes graphics information. Another particular type of benchmarking is video benchmarking. Video benchmarking tests different aspects of a graphics processor and, in particular, the manner in which the graphics processor processes video, performs encoding/decoding (e.g. compression/decompression), etc.

During conventional benchmarking, media data (e.g. video, etc.) may be displayed utilizing a system display and a user may manually inspect the media data on the display to determine whether hardware processing capabilities of the system meet certain benchmarks. For example, an ordinary user may attempt to detect dropped frames, visual artifacts, etc. during such assessment.

Unfortunately, it is difficult for ordinary users to efficiently and accurately perform an assessment of media processing capabilities of a system via a manual inspection. For example, users may be ineffective at, or even incapable of, detecting dropped frames, visual artifacts, etc. for quality assessment purposes, etc. Further, system resources are typically insufficient to automate such assessment process (e.g. there is not enough bandwidth, etc. to decode and capture the media within the system performing the test while monitoring itself and running the test). There is thus a need for addressing these and/or other issues associated with the prior art.

SUMMARY

A media capture system, method, and computer program product are provided for assessing processing capabilities. In use, media data is captured from a system. Additionally, the media data is stored in memory separate from the system. Further, the media data is fed back to the system for assessing media processing capabilities of the system in real-time or non-real-time.

DETAILED DESCRIPTION

Figure 1:
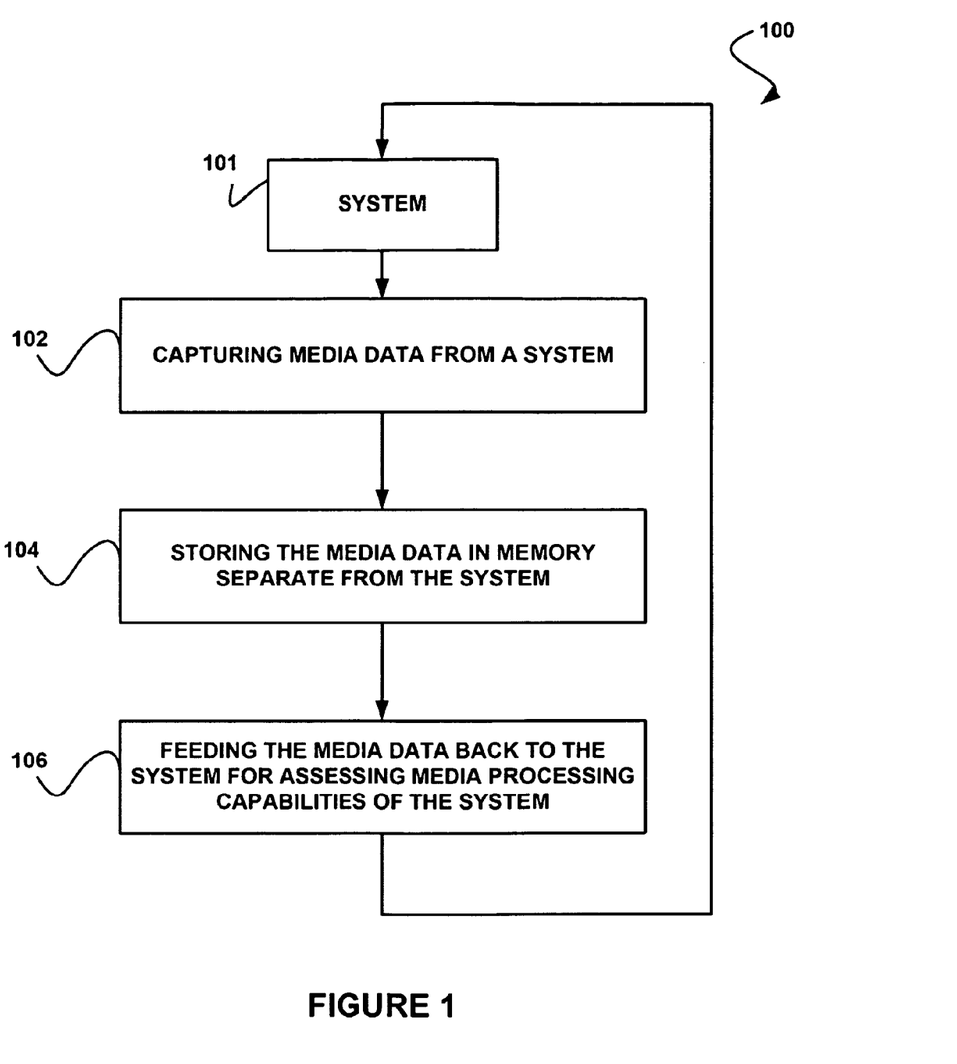
FIG. 1 shows a media capture method for assessing processing capabilities, in accordance with one embodiment.

FIG. 1 shows a media capture method for assessing processing capabilities, in accordance with one embodiment. As shown in operation 102, media data is captured from a system 101. In the context of the present description, the system 101 may include any system from which media data may be captured that is capable of assessing media processing capabilities of such system. For example, in various embodiments, the system 101 may include a client computer, a server computer, a mobile device, etc.

Additionally, the media data may include graphics data, in one embodiment. Such graphics data may include at least one pixel of an image displayed via a display of the system 101. For example, the image may include a plurality of pixels. In another embodiment, the media data may include video data, such as at least one pixel of video displayed via the system display.

In yet another embodiment, the media data may include audio data. Just by way of example, the audio data may include any audio output via the system 101. Of course, it should be noted that the media data may be associated with any type of media (analog and/or digital) capable of being captured from the system 101.

Furthermore, the media data may be captured in any desired manner. In various embodiments, capturing the media data may include receiving, retrieving, etc. the media data from the system 101. In one embodiment, the media data may be captured utilizing an interface. Such interface may include a digital visual interface (DVI), a high definition multimedia interface (HDMI), etc. Thus, the interface may be in communication with a processor [e.g. graphics processor, graphics processing unit (GPU), a central processing unit (CPU), audio processor, video processor, etc.] of the system 101 for capturing the media data after being processed by such processor.

To this end, media data to be displayed, presented, output, etc. utilizing the system 101 may be captured. As another option, the media data may be captured in real-time. For example, the media data may be captured as the media data is output from the processor (e.g. to an output device, etc.).

In addition, the media data is stored in memory separate from the system 101, as shown in operation 104. With respect to the present description, the memory may include any type of memory separate from the system 101 that is capable of storing the media data. For example, the memory may include non-volatile memory (e.g. flash memory, etc.), a disk drive, and/or any other memory that meets the above definition.

In one embodiment, the memory may be included in a device that is separate from the system 101. As an option, such device may include a host processor for processing or parsing the media data in addition to the memory for storing the media data. Accordingly, the device may include a separate client computer, server computer, etc. As another option, the device may only include the memory for storing the media data.

In another embodiment, the memory may be in communication with the system 101. For example, the memory may be coupled to the system 101. In this way, the memory may optionally receive the media data from the system 101 via a communication channel between the memory and the system 101.

Further, as shown in operation 106, the media data is fed back to the system 101 for assessing media processing capabilities of the system 101. In one embodiment, the media data may be fed back to the system 101 from the memory. Just by way of example, the media data may be fed back to the system 101 via the communication channel between the memory and the system 101. In another embodiment, the media data may be fed back to the system 101 utilizing another interface. For example, the interface may include an interface of the system 101, such as a universal serial bus (USB) interface, etc.

In various embodiments, the media processing capabilities assessment may involve gamma correction, motion estimation or compensation, decompression, color space control, brightness, saturation, color temperature correction, sharpening, overlay processing, scaling, encoding, de-interlacing, up/down scaling, digital versatile disk (DVD) decoding, etc. In other embodiments, the media processing capabilities assessment may involve identifying a maximum rate (e.g. frequency, etc.) at which the media data is presented, output, etc., counting and/or analyzing frames of the media data that have been dropped, assessing the quality of the media data (e.g. quality of enhancement of the media data, bit error associated with processing of the media data, quality of decoding of the media data, quality of motion treatment of the media data, etc.), assessing a peak signal-to-noise ratio, assessing audio-video synchronization, etc.

It should be noted that the foregoing examples of media processing are set forth for illustrative purposes only and should not be construed as limiting in any manner. Of course, the media processing may involve any processing that involves any type of media data. For example, the media processing capabilities of the system 101 may include capabilities of any processor of the system 101, such as a graphics processor, video processor, audio processor, or combination thereof, etc.

Moreover, the media processing capabilities assessment may include any evaluation, analysis, etc. of capabilities of the system 101 in processing media data. For example, the media processing capabilities assessment may assess the capabilities of the system 101 in processing the media data fed back to the system 101. In one possible embodiment, the assessment may include comparing the captured media data to a more ideal copy (e.g. a "golden" copy, etc.) of the media data.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
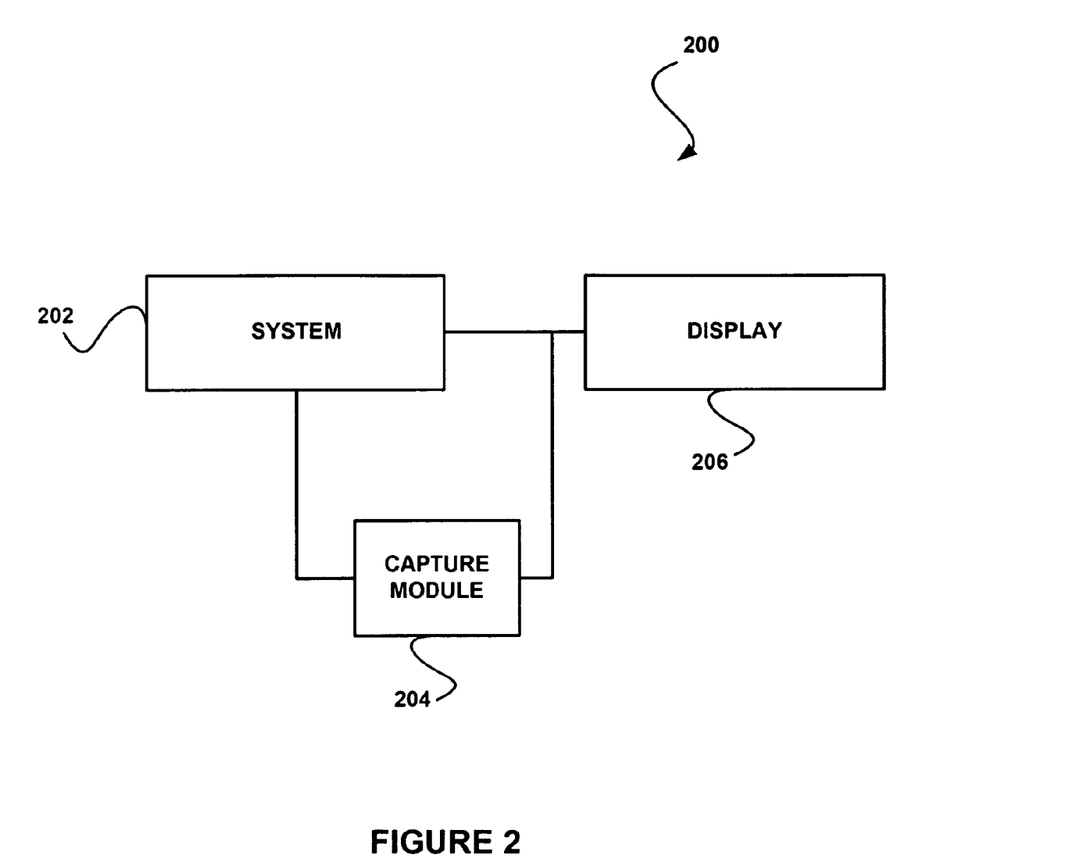
FIG. 2 shows a media capture system for assessing processing capabilities, in accordance with another embodiment.

FIG. 2 shows a media capture system 200 for assessing processing capabilities, in accordance with another embodiment. As an option, the media capture system 200 may be implemented to carry out the method 100 of FIG. 1. Of course, however, the media capture system 200 may be implemented in any desired environment. It should also be noted that the aforementioned definitions may apply during the present description.

As shown, a system 202 is in communication with (e.g. coupled to, etc.) a display 206. With respect to the present embodiment, the system 202 may include any device capable of displaying media data (e.g. video data, etc.) via the display 206. For example, the system 202 may communicate media data to the display 206 for display thereof. The display 206 may include a computer monitor, a television, and/or any other display capable of displaying media data received from the system 202.

In one embodiment, the system 202 may process the media data prior to displaying the media data via the display 206. In various embodiments, the media data processing may involve any of those set forth earlier. Accordingly, the system 202 may include a processor for performing such media data processing.

As also shown, a capture module 204 is in communication with the system 202. In particular, the capture module 204 is separate from the system 202. The capture module 204 may include a device with a processor and memory, or as another option may only include memory external to the system 204.

In one embodiment, the capture module 204 may capture media data from the system 202. For example, the capture module 204 may capture media data after processing of the media data by the system 202. Optionally, the capture module 204 may capture media data via an interface (e.g. DVI, HDMI, etc.) of the system 202. As another option, such interface may be in direct communication with the processor of the system 202 for allowing the capture module 204 to capture the media data from system 202 in any desired manner. As yet another option, the capture module 204 may capture the media data in real-time.

In another embodiment, the capture module 204 may store the captured media data. For example, the capture module 204 may store the captured media in memory (e.g. non-volatile memory, etc.) of the capture module 204. In this way, the media data captured from the system 202 may be stored in memory separate from the system 202.

In use, the capture module 204 may feed the media data back to the system 202 for assessing media processing capabilities of the system 202. The media data may be fed back to the system 202 via an interface of the system 202, such as a USB interface, for example. Optionally, the capture module 204 may feed the media data back to the system 202 in non-real time or real-time. In this way, the capture module 204 may store the media data for a temporary time period (e.g. until requested by the system 202 for assessing media processing capabilities of the system 202, for a predetermined period of time, etc.).

In response to receiving the media data from the capture module 204, the system 202 may assess the media processing capabilities of the system 202. For example, the system 202 may utilize the media data fed back from the capture module 204 for assessing the media processing capabilities of the system 202. Accordingly, the assessment may provide information on the media processing of the media data by the system 202, as an option.

In one embodiment, the assessment performed by the system 202 may involve an algorithm performed by the system 202 (e.g. involving the media data, etc.). In another embodiment, the assessment performed by the system 202 may involve comparing the media data fed back from the capture module 204 with a more ideal copy of the media data (e.g. golden copy, an unprocessed copy of the media data, etc.). Just by way of example, the media data may include a frame of video, and the assessment may include comparing the frame of video fed back from the capture module 204 with an associated golden copy of the frame of video. The comparison and/or algorithm may thus indicate the media processing capabilities of the system 202 (e.g. whether the media processing of the system 202 reduces a quality of the media data, drops the media data, causes problems with audio-video synchronization, etc.).

Figure 3A:
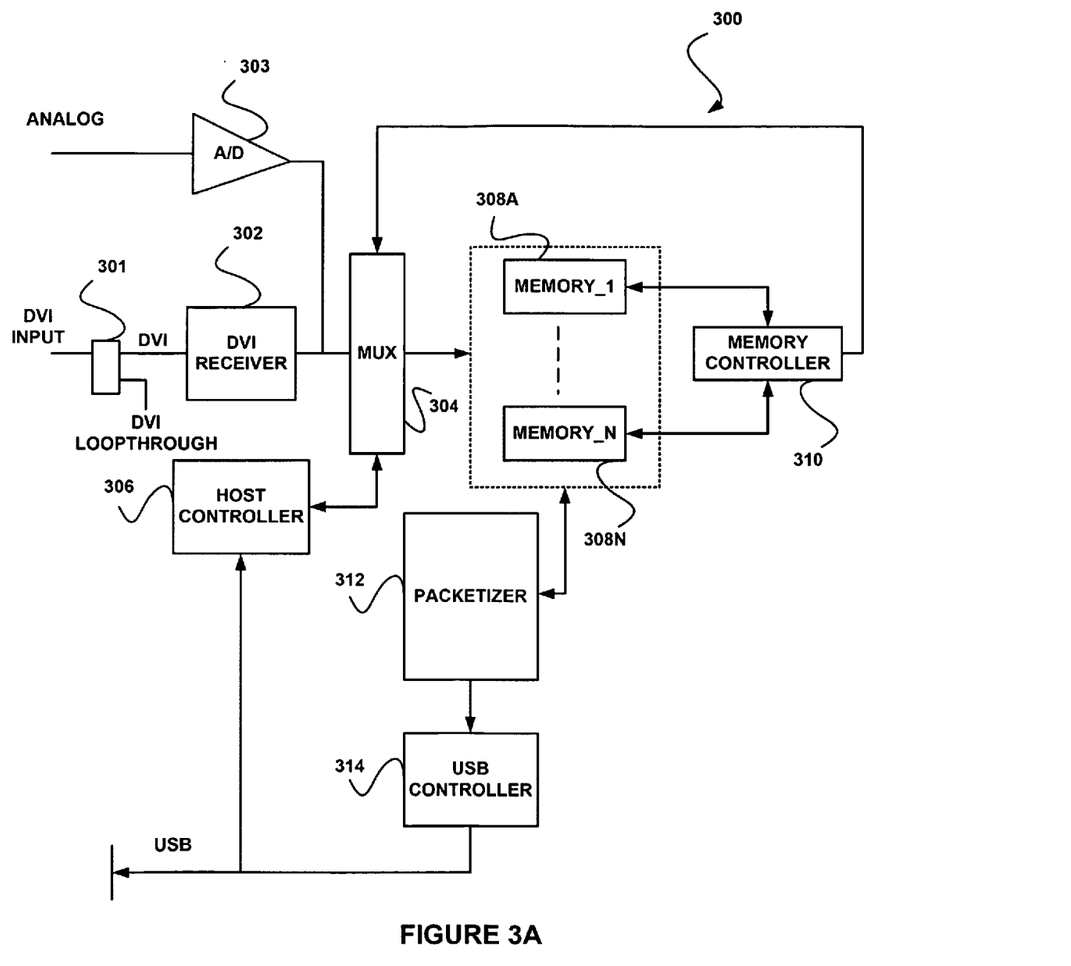
FIG. 3A shows a media capture system for storing media data in memory separate from another system from which the media data was captured, in accordance with yet another embodiment.

FIG. 3A shows a media capture system 300 for storing media data in memory separate from another system from which the media data was captured, in accordance with yet another embodiment. As an option, the media capture system 300 may be implemented in the context of the functionality and architecture of FIGS. 1-2. For example, the media capture system 300 may be implemented in the context of the capture module 204 of FIG. 2. Of course, however, the media capture system 300 may be implemented in any desired environment. Again, it should be noted that the aforementioned definitions may apply during the present description.

As shown, the media capture system 300 includes a DVI receiver 302 that is coupled to a DVI interface of another system (not shown) via a splitter 301. With respect to the present embodiment, the media capture system 300 is separate from such other system. For example, the media capture system 300 may include a device separate from the other system. Optionally, the media capture system 300 may be removably connected to the other system.

In use, the DVI receiver 302 captures media data from the other system via the DVI interface of the other system. The splitter 301 enables such media data to be both channeled to the DVI receiver 302 as well as to other system components (e.g. a display, etc.). Of course, it should be noted that any interface receiver may be utilized for capturing the media data via an associated interface. For example, an analog-to-digital (A/D) converter 303 is provided for receiving analog media data (e.g. VGA, etc.), and converting the same into a digital format. While not shown, an additional splitter may be provided for use with the A/D converter 303.

The A/D converter 303 and DVI receiver 302 further communicate the captured media data to a multiplexer 304. The multiplexer 304 is also in communication with a host controller 306. In operation, the host controller 306 directs the multiplexer 304 to pass either all of the captured media data, or only a portion (e.g. certain lines, pixels, etc.) of the captured media data for optimizing a bandwidth/resolution within the system 300. More information regarding the manner in which such portion of media data may be selected will be set forth in greater detail during reference to subsequent figures.

In one example of use, the host controller 306 may be controlled by the other system (e.g. via an interface, as shown), such that the other system may control, via the host controller 306, which portion(s) of the captured media data the multiplexer 304 selects. As mentioned earlier, the host controller 306 may instruct the multiplexer 304 to select only a specific subpart of the captured media data, or all of the captured media data, etc. In one exemplary embodiment, the other system may control the multiplexer 304 via the host controller 306 to select a subset of pixels within each of a plurality of frames of the captured media data.

Based on input from the host controller 306, the multiplexer 304 selects any indicated portion of the captured media data and forwards such selected portion for storage in memory 308A-N. As shown, the memory 308A-N may be apportioned. In this way, the captured media data (or subpart thereof) may be apportioned among the various portions of the memory 308A-N.

To accomplish this, a memory host controller 310 may remain in communication with each of the portions of the memory 308A-N and the multiplexer 304, for controlling the manner in which the selected portion of the captured media data is stored in the portions of the memory 308A-N. Just by way of example, under the direction of the memory controller 310, a single pixel or optionally a plurality of pixels (e.g. a predefined number, etc.) of the selected portion of the captured media data may be stored in each of the portions of the memory 308A-N. In use, the memory controller 310 in combination with the multiplexer 304 may further interleave any portions of the captured media data indicated by the host controller 306 in the various portions of the memory 308A-N, for optimizing a bandwidth associated with the memory write operations.

Furthermore, a packetizer 312 is provided to read the media data stored in the memory 308A-N. In one embodiment, the packetizer 312 may packetize the media data stored in the memory 308A-N (e.g. form the media data into packets for future communication of data to the other system). Of course, however, the packetizer 312 may optionally format the media data stored in the memory 308A-N in any desired manner.

Further, the packetizer 312 communicates the media data read from the memory 308A-N to a USB controller 314. As shown, the USB controller 314 is in communication with a USB interface of the other system. Accordingly, the USB controller 314 may feed the media data (e.g. the packetized media data) from the media capture system 300 back to the other system, such that the other system may assess media processing capabilities of such other system.

It should be strongly noted that, while a USB-type interface is included in the present embodiment, absolutely any other type of interface may be employed. For example, such other interface may allow for either local or remote communication (e.g. via a network). To this end, any data command/control interface is contemplated.

Figure 3B:
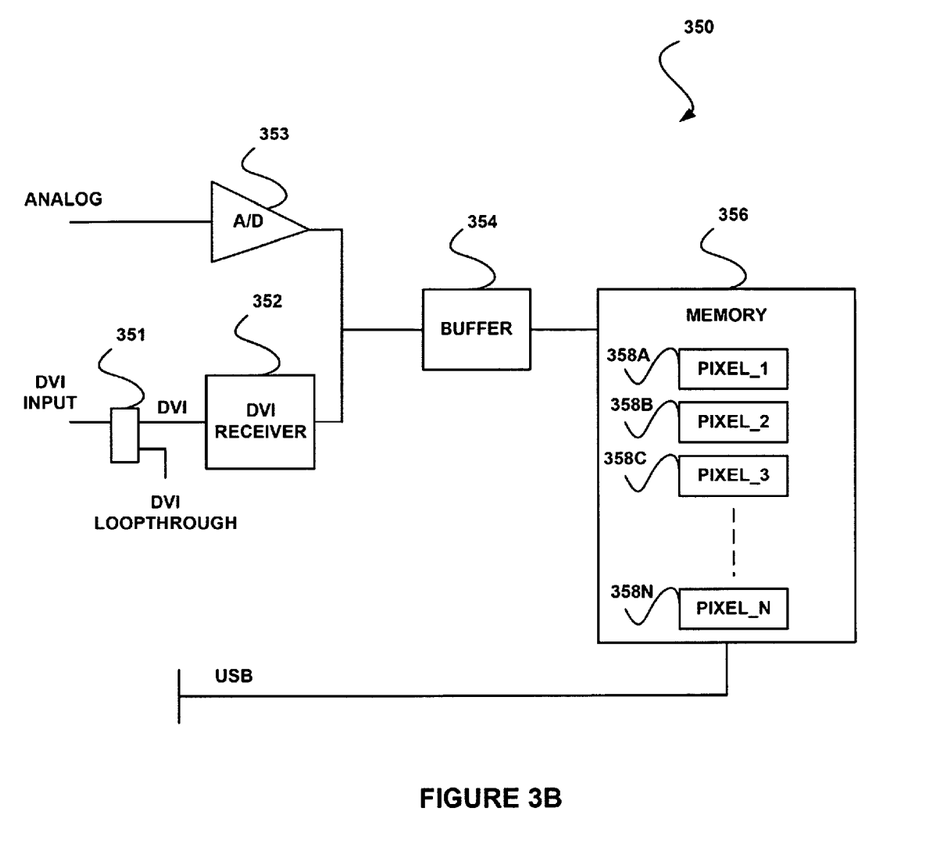
FIG. 3B shows a media capture system for storing media data in memory separate from another system from which the media data was captured, in accordance with still yet another embodiment.

FIG. 3B shows a media capture system 350 for storing media data in memory separate from another system from which the media data was captured, in accordance with still yet another embodiment. As an option, the media capture system 350 may be implemented in the context of the functionality and architecture of FIGS. 1-2. For example, the media capture system 350 may be implemented in the context of the capture module 204 of FIG. 2. Of course, however, the media capture system 350 may be implemented in any desired environment. Again, it should be noted that the aforementioned definitions may apply during the present description.

As shown, the media capture system 350 includes a DVI receiver 352 that is coupled to a DVI interface of another system (not shown) via a splitter 351. In use, the DVI receiver 302 captures media data from the other system via the DVI interface of the other system. The splitter 351 enables such media data to be both channeled to the DVI receiver 352 as well as to other system components (e.g. a display, etc.). Of course, it should be noted that any interface receiver may be utilized for capturing the media data via an associated interface. For example, an analog-to-digital (A/D) converter 353 is provided for receiving analog media data (e.g. VGA, etc.), and converting the same into a digital format. While not shown, an additional splitter may be provided for use with the A/D converter 353.

The A/D converter 353 and DVI receiver 352 further communicate the captured media data to a buffer 354. In one embodiment, the buffer 354 may include a dynamic random access memory (DRAM), but, of course, may include any other type of memory. Thus, the captured media data may be buffered via the buffer 354. In one embodiment, the size of the buffer 354 may depend on a frequency at which the media data is captured from the other system. For example, the size of the buffer 354 may depend on a number of frames per second at which frames of the media data is captured. Of course, however, the size of the buffer 354 may also be preconfigured.

Furthermore, the captured media data is communicated from the buffer 354 to memory 356. The memory 356 may therefore store the captured media data. As shown, the memory 356 may store a plurality of pixels 358A-N of the media data. Accordingly, the captured media data may be buffered before being stored in the memory 356.

Still yet, the media capture system 350 feeds the captured media data stored in the memory 356 back to the other system via an interface (e.g. USB interface, etc.). Thus, each pixel 358A-N of the media data stored in the memory 356 may be fed back to the other system, for example. To this end, the other system may assess media processing capabilities of such other system, utilizing the media data.

Figure 4A:
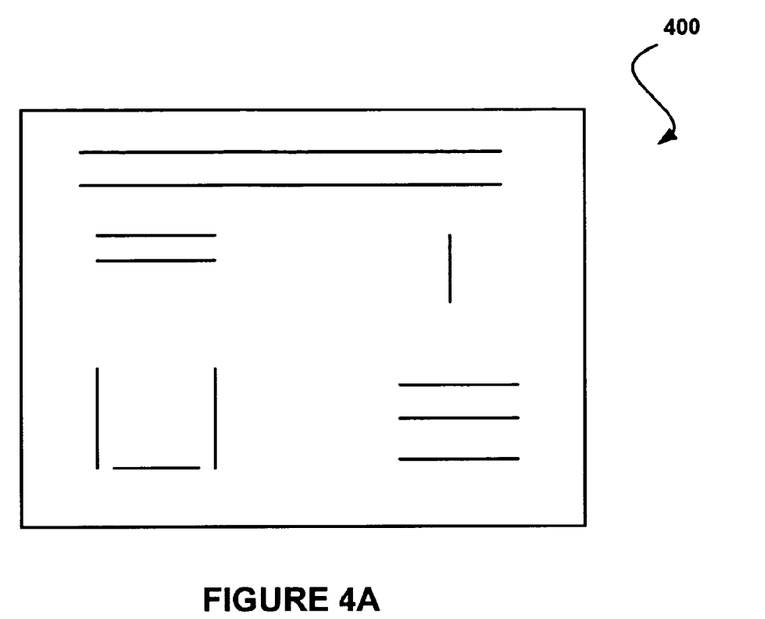
FIG. 4A shows a partial frame of media data, in accordance with another embodiment.

FIG. 4A shows a partial frame 400 of media data, in accordance with another embodiment. As an option, the frame 400 may be implemented in the context of the functionality and architecture of FIGS. 1-3B. Of course, however, the frame 400 may be implemented in any desired environment. Again, it should be noted that the aforementioned definitions may apply during the present description.

In the context of the present embodiment, the partial frame 400 may include a partial frame of media data (e.g. a frame of video data, etc.) captured from a system. In the present embodiment, a portion of a frame (e.g. certain sequences of pixels, etc.) may be stored in the memory separate from such system. Further the partial frame 400 may be fed back to the system for assessing media processing capabilities of the system. Of course, in other embodiments, the entire frame may be captured and stored.

As shown, the partial frame 400 may include a plurality of horizontal and vertical sequences of pixels. Thus, each pixel within the partial frame 400 of media data may be captured. Such information may further be fed back to the system, as noted above, such that the system may assess media processing capabilities of the system, utilizing the pixels.

Figure 4B:
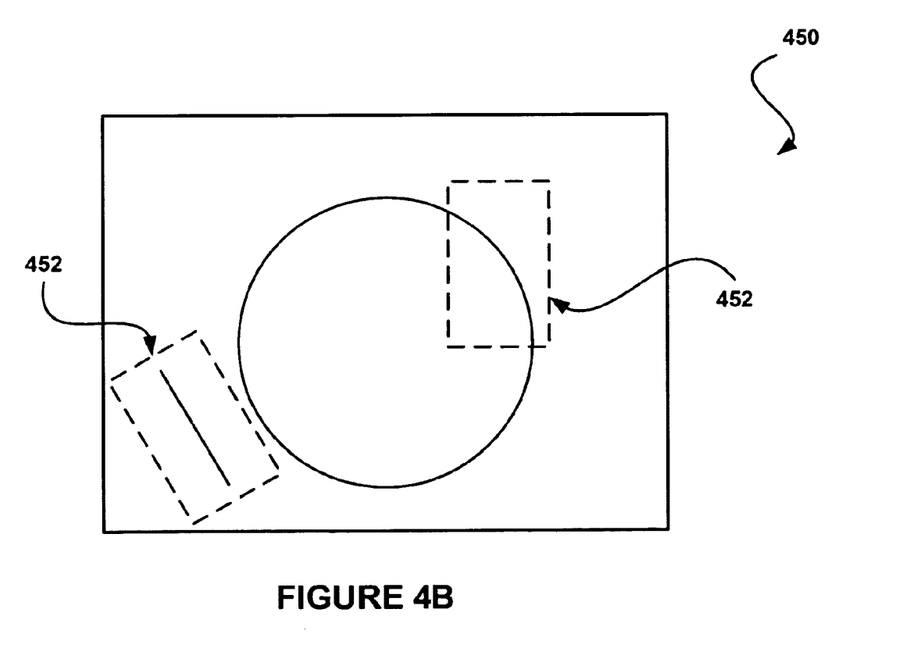
FIG. 4B shows a frame of media data from which a portion is stored, in accordance with yet another embodiment.

FIG. 4B shows a frame 450 of media data from which a portion is stored, in accordance with yet another embodiment. As an option, the frame 450 may be implemented in the context of the functionality and architecture of FIGS. 1-3B. Of course, however, the frame 450 may be implemented in any desired environment. Again, it should be noted that the aforementioned definitions may apply during the present description.

In the context of the present embodiment, the frame 450 may include a frame of media data (e.g. a frame of video data, etc.) that is captured from a system. As shown, the frame 450 may include a plurality of pixels that form an image of a circle and a diagonal line outside of the circle. As an option, the image of the circle and/or the diagonal line may be scaled to a particular proportion.

As also shown, only a portion 452 of the frame 450 may be selected. The portion 452 may include any subset of the frame 450. For example, the portion 452 may include a subset of pixels included in the frame 450.

It should be noted that the portion 452 may be selected in any desired manner. In one embodiment, the portion 452 may be selected based on predetermined coordinates. For example, the predetermined coordinates may indicate pixels to be stored in memory. In another embodiment, the portion 452 may be identified utilizing a horizontal and vertical counter, pixel mask, frame counter, etc. In other embodiments involving audio media data, a wall clock, etc. may be used to identify the appropriate portion.

The selected portion 452 of the frame 450 may then be stored in memory separate from the system from which the frame 450 was captured. Storing only a selected portion 452 of the frame 450 may opportunistically limit the amount of memory consumption associated with storing captured media data, in one embodiment. Further, it may opportunistically require less processing power to achieve optimal bandwidth. Still yet, the portion 452 of the frame 450 may be fed back to the system from the memory for assessing media processing capabilities of such system. Feeding back only the portion 452 of the frame 450 may optionally limit such assessment to be based on such portion 452, thus opportunistically reducing resource consumption associated with the system in performing the assessment of the media processing capabilities of the system.

Figure 5:
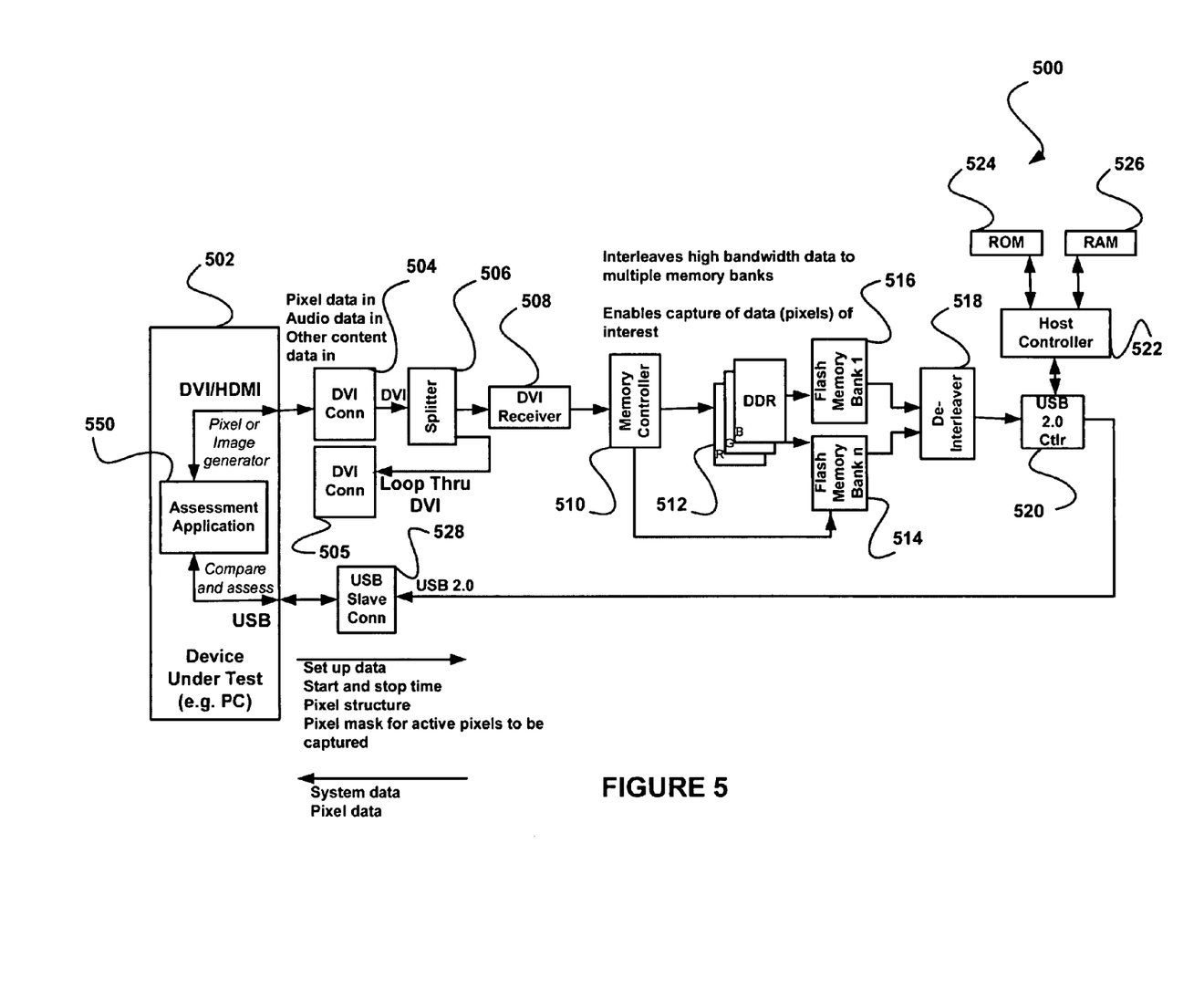
FIG. 5 shows a media capture system for assessing processing capabilities utilizing media data stored in memory separate from another system from which the media data was captured, in accordance with another embodiment.

FIG. 5 shows a media capture system 500 for assessing processing capabilities utilizing media data stored in memory separate from another system from which the media data was captured, in accordance with another embodiment. As an option, the media capture system 500 may be implemented in the context of the functionality and architecture of FIGS. 1-4. Of course, however, the media capture system 500 may be implemented in any desired environment. Again, the aforementioned definitions may apply during the present description.

As shown, media data (e.g. pixel data, audio data, image, etc.) is captured from an interface (e.g. DVI, HDMI, etc.) of a system 502. In particular, the media data is captured utilizing a DVI connection 504. Thus, generated or otherwise processed media data capable of being presented via the system 502 may be captured. The media data may be captured from an assessment application 550 of the system 502. For example, the assessment application 550 may generate the media data.

In addition, the captured media data is sent to a splitter 506. The splitter 506 may enable the media data to be both channeled to a DVI receiver 508 as well as to another DVI connection 505. The other DVI connection 505 may include a connection to other system components (e.g. a display, etc.).

Upon receipt of the media data, the DVI receiver 508 forwards the media data to a memory controller 510. The memory controller 510 may select only a portion of the media data for storage. For example, the memory controller 510 may select a portion based on an instruction from the system 502.

In another embodiment, the memory controller 510 may send the media data, or any selected portion thereof, to double data rate (DDR) memory 512, or any other type of memory for that matter. For example, the DDR memory 512 may include multiple DDR memory portions. In one embodiment, each portion of the DDR memory 512 may store pixel data that is associated with a different color.

Further, the media data is sent from the DDR memory 512 to a plurality of flash memory banks 514 and 516. For example, the media data from the DDR memory 512 may be interleaved among the flash memory banks 514 and 516. As an option, the interleaving may be controlled by the memory controller 510.

Still yet, media data communicated from the flash memory banks 514 and 516 is de-interleaved utilizing a de-interleaver module 518. In this, way, media data interleaved into the flash memory banks 514 and 516 may be de-interleaved. Such de-interleaving may include formatting the media data into the format in which the media data was captured from the system 502.

As also shown, a USB 2.0 controller 520 receives the de-interleaved media data from the de-interleaver module 518. In one embodiment, the USB 2.0 controller 520 may be used by an assessment application 550 to control the capturing of the media data from the system 502. For example, the USB 2.0 controller 520 may, under the control of the assessment application 550, instruct the DVI receiver 508, via a USB interface of the system 502, to receive media data from the system 502 during an indicated time period (e.g. a time period between a start time and stop time, etc.). Of course, other techniques are also contemplated for controlling the manner in which the media data is captured and stored (e.g. indicating a pixel structure, using a pixel mask for active pixels to be captured, etc.).

In use, the USB 2.0 controller 520 may communicate the media data to a host controller 522, which stores the media data in memory. As shown, the host controller 522 may write the media data to read-only memory (ROM) 524 and/or random access memory (RAM) 526.

Moreover, the host controller 522 may read the stored media data from the ROM 524 and/or RAM 526. In one embodiment, the host controller 522 may read the stored media data in response to an instruction from the assessment application 550 executed on the system 502. Optionally, such instruction may be received from the system 502 by the memory controller 522 via the USB interface of the system 502. Thus, the ROM 524 and/or RAM 526 may be used to temporarily store the media data.

After reading the stored media data from the ROM 524 and/or RAM 526, the host controller 522 communicates the media data to the USB 2.0 controller 520. The USB 2.0 controller 520 further communicates the media data back to the system 502 via a USB slave connection 528. Further, the assessment application 550 of the system 502 may receive the media data captured therefrom for use in assessing processing capabilities of such system 502.

For example, in various embodiments, different tests may be performed by the assessment application 550. In one embodiment, the assessment application 550 may determine whether each of a plurality of frames captured during a predetermined time period were, in fact, rendered. In another embodiment, visual values (e.g. color values, etc.) may be evaluated, etc. In yet another embodiment, the assessment application 550 may compare the received media data with a more ideal copy of the media data (e.g. golden copy, an unprocessed copy of the media data, etc.) for assessing processing capabilities of the system 502. Of course, such exemplary assessments are set forth for illustrative purposes only and should not be construed as limiting in any manner whatsoever.

Figure 6:
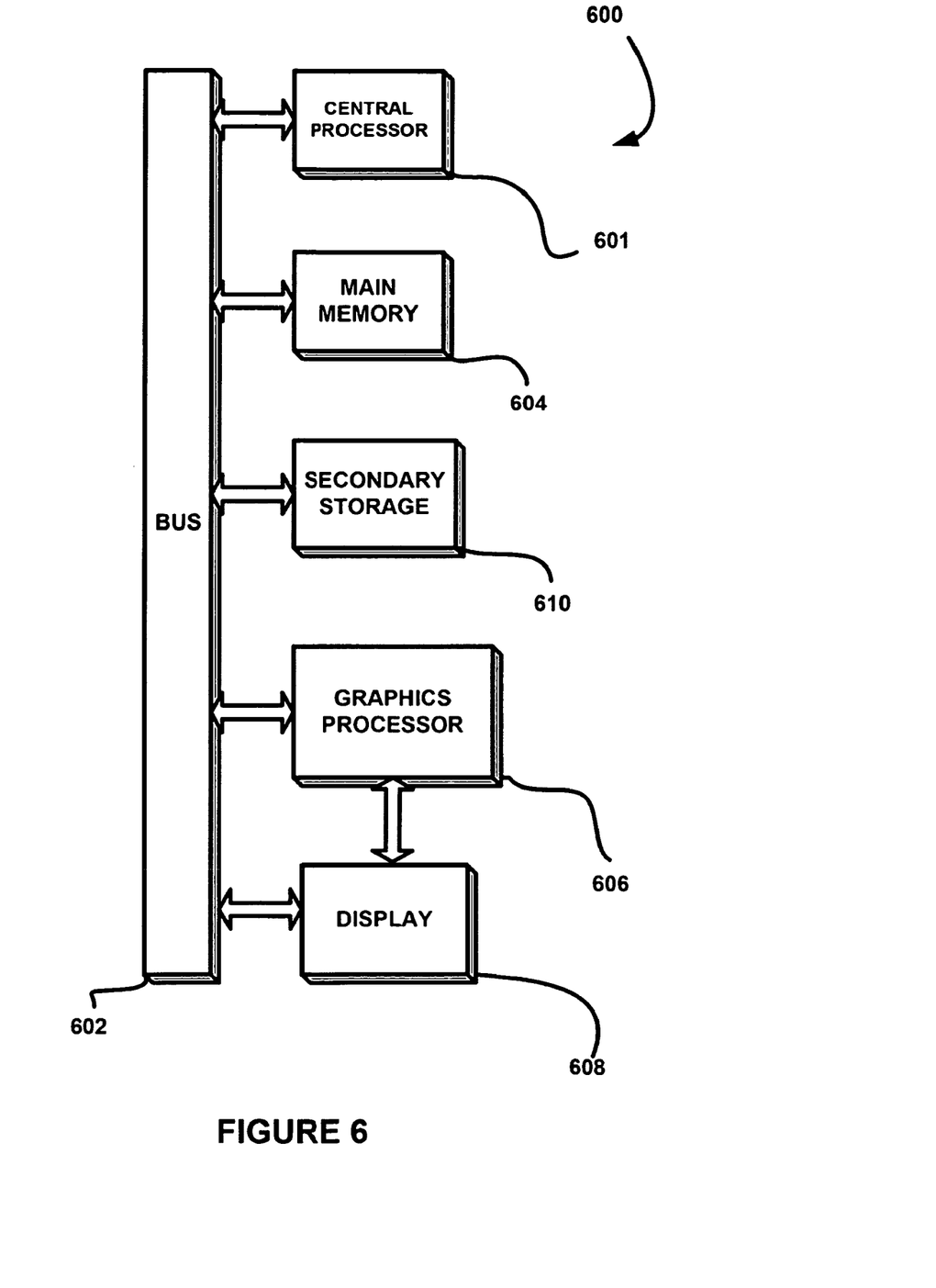
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608, i.e. a computer monitor. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610 and/or any other storage are possible examples of computer-readable media.

In one embodiment, the architecture and/or functionality of the various previous figures may be implemented in the context of the host processor 601, graphics processor 606, an integrated circuit (not shown) that is capable of at least a portion of the capabilities of both the host processor 601 and the graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, lap-top computer, and/or any other type of logic. Still yet, the system 600 may take the form of various other devices including, but not limited to, a personal digital assistant (PDA) device, a mobile phone device, a television, etc.

Further, while not shown, the system 600 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   capturing media data from a system;
   storing the media data in memory separate from the system;
   feeding the media data back to the system for assessing media processing capabilities of the system; and
   comparing the media data fed back to the system with a second copy of the media data that is an unprocessed copy of the media data, wherein the comparison is utilized for the assessing of the media processing capabilities of the system;
   wherein only a portion of the media data is stored;
   wherein the stored portion of the media data includes a specific line of the captured media data for comparison with the unprocessed copy of the media data.

2. The method of claim 1, wherein the media data includes at least one of graphics data, video data, and audio data.

3. The method of claim 1, wherein the media data is captured utilizing a digital visual interface.

4. The method of claim 1, wherein the memory includes non-volatile memory.

5. The method of claim 4, wherein the non-volatile memory includes flash memory.

6. The method of claim 1, wherein the media data is buffered before being stored in the memory.

7. The method of claim 1, wherein the media data is stored in the memory utilizing a memory controller and a multiplexer.

8. The method of claim 1, wherein the media data is fed back to the system utilizing an interface.

9. The method of claim 8, wherein the interface includes a universal serial bus interface.

10. The method of claim 1, wherein the media data is packetized before being fed back to the system.

11. The method of claim 1, wherein the portion of the media data is selected utilizing a controller.

12. The method of claim 11, wherein the controller is controlled by the system.

13. The method of claim 1, wherein the media data is captured in real-time.

14. The method of claim 1, wherein the media processing capabilities of the system include capabilities of at least one of a graphics processor, a video processor, and an audio processor.

15. A computer program product embodied on a computer readable medium, comprising:
   computer code for receiving media data at a system, the media data being captured and stored in memory separate from the system and further fed back to the system from the memory;
   computer code for comparing the received media data with a second copy of the media data that is an unprocessed copy of the media data, wherein the comparison is utilized for assessing media processing capabilities of the system; and
   computer code for the assessing of the media processing capabilities of the system, utilizing the received media data;
   wherein only a portion of the media data is stored;
   wherein the stored portion of the media data includes a specific line of the captured media data for comparison with the unprocessed copy of the media data.

16. An apparatus, comprising:
   an interface receiver for capturing media data from a system; and
   memory in communication with the interface receiver, the memory storing the captured media data separate from the system and feeding the stored media data back to the system for assessing media processing capabilities of the system;
   wherein the stored media data is fed back to the system from the memory for comparing the media data with a second copy of the media data that is an unprocessed copy of the media data, and wherein the comparison is utilized for the assessing of the media processing capabilities of the system;
   wherein only a portion of the media data is stored;
   wherein the stored portion of the media data includes a specific line of the captured media data for comparison with the unprocessed copy of the media data.

17. The apparatus of claim 16, wherein the apparatus is removably connected to the system.

18. The apparatus of claim 16, wherein the media processing capabilities of the system include capabilities of at least one of a graphics processor, a video processor, and an audio processor.

19. The method of claim 1, wherein the comparison of the media data fed back to the system with the second copy of the media data that is the unprocessed copy of the media data indicates whether the media processing capabilities of the system reduce a quality of the media data.

20. The method of claim 1, wherein the comparison of the media data fed back to the system with the second copy of the media data that is the unprocessed copy of the media data indicates whether the media processing capabilities of the system drop at least a portion of the media data.

21. The method of claim 1, wherein the comparison of the media data fed back to the system with the second copy of the media data that is the unprocessed copy of the media data indicates whether the media processing capabilities of the system create a problem with an audio-video synchronization of the media data.

22. The method of claim 1, wherein the stored portion of the media data is selected based on predetermined coordinates.

23. The method of claim 22, wherein the predetermined coordinates indicate pixels to be stored in the memory separate from the system.

* * * * *